Dec. 4, 1951          F. G. SCHWALBE                 2,577,486
                RESILIENT WORK SUPPORT FOR GLASS
                    MARKING OR CUTTING MACHINES
                       Filed April 4, 1949
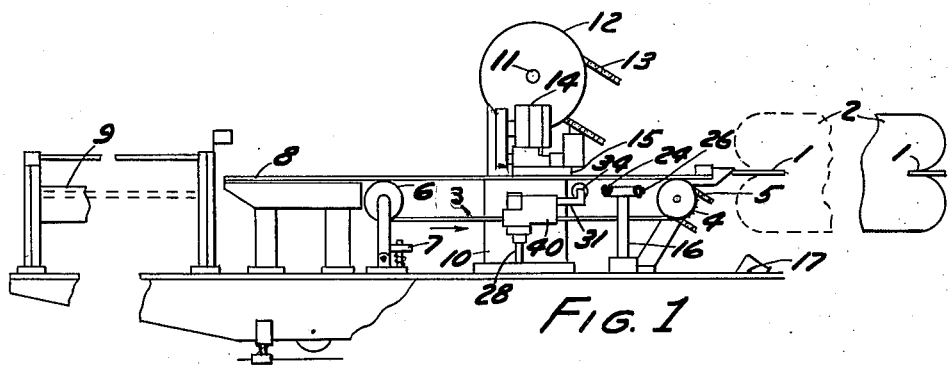
FIG. 1
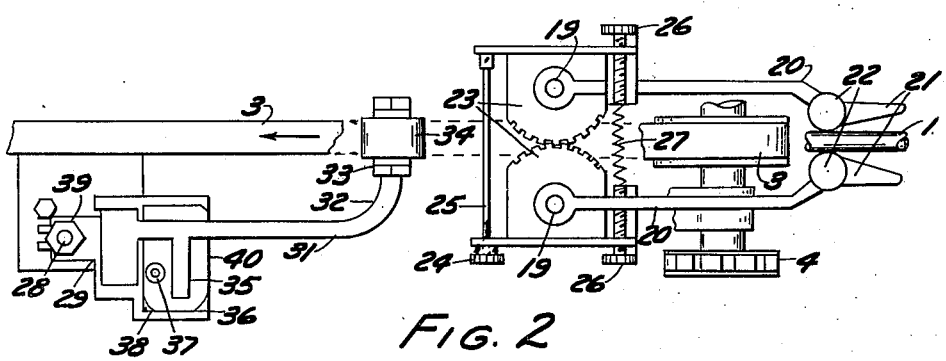
FIG. 2
FIG. 3
FIG. 4
Inventor
Franz G. Schwalbe
By
Attorney Patented Dec. 4, 1951

2,577,486

UNITED STATES PATENT OFFICE 2,577,486

RESILIENT WORK SUPPORT FOR GLASS MARKING OR CUTTING MACHINES

Franz G. Schwalbe, Toledo, Ohio, assignor to Toledo Engineering Company Inc., Toledo, Ohio, a corporation of Ohio Application April 4, 1949, Serial No. 85,279

3 Claims. (Cl. 49—48)

This invention relates to directing for, and marking or severing lengths of, strip, rod or tubular stock, primarily in conjunction with a continuous uniform lineal feed or supply thereof.

This invention has utility when incorporated in a receiver for preformed or drawn material, as rods or tubing, say for glass having take-off from a furnace and feeding the mechanism of this disclosure, whereby the continuous run of such supplied stock is cut up into accurate sections or lengths, an instance being that for fluorescent light tubing.

Referring to the drawings:

Fig. 1 is a largely diagrammatic, fragmentary showing in side elevation of equipment from a receiving housing to a delivery table, with the marker or cutter located therebetween, with the stock control feature of the invention at the marker or cutter active station;

Fig. 2 is a plan view, on an enlarged scale, with some portions broken away, showing the directing or centering means for the stock to the marker station and the delicate pneumatic poising means for the stock conveyor at said station;

Fig. 3 is a side elevation of the rod travel lateral direction control device of the directing means and the conveyor belt poising means of Fig. 2, parts being broken away; and Fig. 4 is a perspective view of the air-inflated rubber bag, as adjustable in pressure, in providing nicety of control for the conveyor in being yieldably poised toward, or opposing the cutter or marker in the vicinity of its operation on the traveling stock.

As an illustrative instance, the supply stock may be considered as glass tubing 1 being delivered to a housing 2 by a continuous tube drawing machine from a molten glass supply at a furnace. The stock 1, in passing at a definite travel rate from the housing 2, is fed to an endless conveyor 3 having a sprocket wheel drive 4 from a chain 5 in synchronism with the stock travel thru the housing 2. The conveyor 3 thus has its upper reach slack in its travel from the housing 2 to its follower wheel 6 having a spring poised belt-tightener mounting 7. The marked stock from the conveyor 3 is thrust upon a way 8 and then to a chute 9 for the severed sections.

Laterally of the conveyor 3, a standard 10 mounts a shaft 11 on which there is rotary housing means 12 driven by a sprocket chain 13, also in adjusted synchronism with the travel speed of the stock 1. The housing means 12 revolves a motor 14 provided with a rotary disk marker or cutter 15. In its revolution cycle as determined by the housing means 12, the lower rotating edge of the cutter 15 is brought into definite spacing proximity to the top of the conveyor 3 while the disk is approximating the lineal travel rate of the conveyor 3. The proximity spacing, which is predetermined, is such that the rotating disk 15 may have its effective marking, if not a cutting or definite breaking contact with at least the very upper edge or tangent portion of the glass tubing 1. Inasmuch as in practice the travel speed of the stock 1 may be even upward of 10 ft. per second, and the interval of actual disk 15 contact with the stock 1 be almost only momentary, there is precluded development of a scar lengthwise of the stock 1. This is achieved by so controlling the speed of revolution for the housing means 12 that, during the interval of contact, there is avoided any relative lineal travel departure therebetween.

*Directing the stock to the marker*

Toward the housing 2 and adjacent the driving end of the conveyor 3, a bracket 16 rises from a floor 17, say of a truck mounting or carrier for the general portable unit as adapted to be locked at an appropriate position for receiving stock supply. The bracket 16 provides bearings 18 in parallel for vertical stub shafts 19, one on each side of the conveyor belt 3 upper reach. Fixed with each shaft 19 is an arm 20 directly along the conveyor 3 toward the housing 2 with opposing flare or guide portions 21. There is thus provided converging directing means just above the plane of the conveyor 3 upper reach to a pair of vertical axis guide rolls 22 spaced apart by the stock 1 riding therebetween providing a defined yieldable course upper section against lateral shifting for the rod stock in passing directly to the conveyor belt 3 upper reach.

Fixed with each shaft 19 below the underside of the upper reach of the conveyor 3, is a gear segment 23 toward each other and in mesh. This means that as the guides 21 and the rolls 22 move toward or away from each other, such movement is identical for each thereof, whereby the transit of the stock 1 is at all times maintained central of the conveyor belt 3, should there be different diameter stock, or variations in stock diameter.

A knurled disk 24 has thread connection with a rod 25 as an adjustable link connection between the gear segments 23 on the side of the fulcrum shafts 19 remote from the rolls 22. There is thus provided manually adjustable means at the disk 24 for limiting the distance toward each other which the rolls 22 may take, with latitude for outward swing, or wider spacing. This may serve as a safeguard against applying too much pressure upon fragile tubular stock, especially if such be still somewhat plastic and responding to pressure distortion. There is thus provided an equalizer interconnection between the rolls 22.

Between the shafts 19 as fulcra and the rolls 22, knurled head adjusting screws 26 are operable as manual adjusting means to vary the tension on a helical spring 27 therebetween. This tension spring 27 accordingly acts as the yieldable means to crowd the rolls 22 toward each other to frictionally embrace and center the stock 1, to the extent the link 25 as adjusted by the disk 24 will permit.

The course of the stock 1 from the housing 2 is to be gripped by the rolls 22. The stock 1 as passing between the rolls 22 is definitely held to the medial or central position of the upper reach of the conveyor 3. In this central position, the stock is thus held against lateral shifting tendency which might be developed by the momentary marking contact from the disk 15 in its high speed rotation.

*Pneumatic cushion poise for the stock at the marker contact interval*

In sequence along the travel direction of the upper reach of the conveyor 3 from the bracket 16, there rises from the deck or floor 17, a bracket 28, adjustably mounted thereon upward, as may be the case for the arms 20 as to the bracket 16, is a block or unit 29 providing a fulcrum 30 from which extends a lever 31 having an offset free end 32 with a riser bracket 33 for a roller 34 to ride along the underside of the conveyor 3 upper reach in proximity to the region of the marking thereabove by the disk 15 providing a defined yieldable sustaining course section against depression of the rod stock. This may be considered as a third class lever 31, with the load or work at the roller 34 and the power at an arm or seat 35.

The block 29 has therefrom a ledge or shelf 36 spaced below the seat 35. A valve stem 37 on a rubber tube section 38 provides adjustable pressure inflation for this air tight sealed portion of bicycle tire inner tube. Nuts 39 upon the bracket stem 28 as above the unit 29, may anchor a sheet metal shield 40 as a cover for the delicate pneumatic poise bag or element 38, in providing an automatic yield or give for the conveyor 3 slack reach at marker 15 contact with the work or stock 1.

Copending herewith this applicant had application for United States Letters Patent Serial No. 553,197, filed September 8, 1944, Adjustable Length Marking Machines, and now abandoned; and copending therweith application filed May 31, 1943, developing into United States Letters Patent No. 2,447,962, August 24, 1948, Cutoff Machine.

What is claimed and it is desired to secure by Letters Patent is:

1. In a conveyor, a supporting mechanism for a run of the conveyor, said mechanism comprising a lever, a pivot for said lever, and air-bag cushion means contacting said lever to provide a yieldable resistance to the motion of said lever about said pivot.

2. For control of stock at a work station of a stock length marking device, a handling machine for the stock, said machine having a lineal section adjacent the work station of the stock marking device, said station including a transverse thrust marking device and a conveyor, equalizer arms directing stock centrally of the conveyor, a roller against the opposite side of the conveyor from the stock, and mounting means for the roller embodying an air-bag cushion yieldably directing the roller to hold the conveyor for positioning the stock against the marking device.

3. The machine of claim 2 wherein the conveyor is an endless belt locally responsive to flexing action of the roller.

FRANZ G. SCHWALBE.

REFERENCES CITED

The following references are of record in the file of this patent:

UNITED STATES PATENTS

| Number | Name | Date |
|---|---|---|
| 1,807,619 | Boush | June 2, 1931 |
| 2,007,910 | Stephens | July 9, 1935 |
| 2,157,067 | Brown | May 2, 1939 |
| 2,438,068 | Mercier | Mar. 16, 1948 |
| 2,447,962 | Schwalbe | Aug. 24, 1948 |
| 2,497,586 | Coons | Feb. 14, 1950 |